United States Patent
Tek et al.

(10) Patent No.: US 7,394,933 B2
(45) Date of Patent: Jul. 1, 2008

(54) REGION COMPETITION VIA LOCAL WATERSHED OPERATORS

(75) Inventors: Huseyin Tek, Princeton, NJ (US); Ferit Akova, Lawrenceville, NJ (US); Alper Ayvaci, Lawrenceville, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 266 days.

(21) Appl. No.: 11/231,424

(22) Filed: Sep. 21, 2005

(65) Prior Publication Data

US 2006/0098870 A1 May 11, 2006

Related U.S. Application Data

(60) Provisional application No. 60/625,991, filed on Nov. 8, 2004.

(51) Int. Cl.
*G06K 9/34* (2006.01)

(52) U.S. Cl. ...................................... 382/173

(58) Field of Classification Search ......... 382/173–180, 382/190, 195, 199, 203
See application file for complete search history.

(56) References Cited

U.S. PATENT DOCUMENTS

2003/0099397 A1* 5/2003 Matsugu et al. ............. 382/173
2004/0258305 A1* 12/2004 Burnham et al. ............ 382/171

OTHER PUBLICATIONS

Nguyen, "Watersnakes: Energy-Driven Watershed Segmentation", Mar. 2003, IEEE Transactions on Pattern Analysis and Machine Intelligence vol. 25 No. 3.*

Adams, "Seeded Region Growing", Jun. 1994, IEEE Transaction on Pattern Analysis and Machine Intelligence vol. 16 No. 6.*

Mehnert, "An Improved Seeded Region Growing Algorithm", 1997, Elsevier, Pattern Recognition Letters 18 (1997) pp. 1065-1071.*

Bleau, "Watershed-Based Segmentation and Region Growing", Academic Press (Ideal Library), 1999, Computer Vision and Image Understanding 77, pp. 317-370.*

Haris, "Watershed-based Image Segmentation with Fast Region Merging", IEEE, 1998.*

Lin, "Unseeded Region Growing for 3D Image Segmentation", Australian Computer Society, Pan-Sydney Workshop on Visual Information Processing Dec. 2000.*

Beare, "Regularized Seeded Region Growing", Math. Morphology, Proc. Sixth Int'l Symp. (ISMM '02), pp. 91-99, 2002.*

Tek, "Image Segmentation by Reaction-Diffusion Bubbles", Fifth International Conference on Computer Vision, Boston, MA, Jun. 1995.*

Zhu, "Region Competition: Unifying Snakes, Region Growing, and Bayes/MDL for Multi-Band Image Segmentation"; IEEE Transaction on Pattern Analysis and Machine Intelligence, vol. 18 No. 9, 1996.*

* cited by examiner

*Primary Examiner*—Samir A. Ahmed
*Assistant Examiner*—Nathan Bloom
(74) *Attorney, Agent, or Firm*—Donald B. Paschburg; F. Chau & Associates, LLC

(57) ABSTRACT

An exemplary method of segmenting an object from a structure of interest is provided. A user-selected point in an image is received. A watershed transformation is performed on the user-selected point to determine a primary object. A neighboring watershed region is added to the primary object based on region competition and a smoothness constraint to form an updated object.

19 Claims, 12 Drawing Sheets

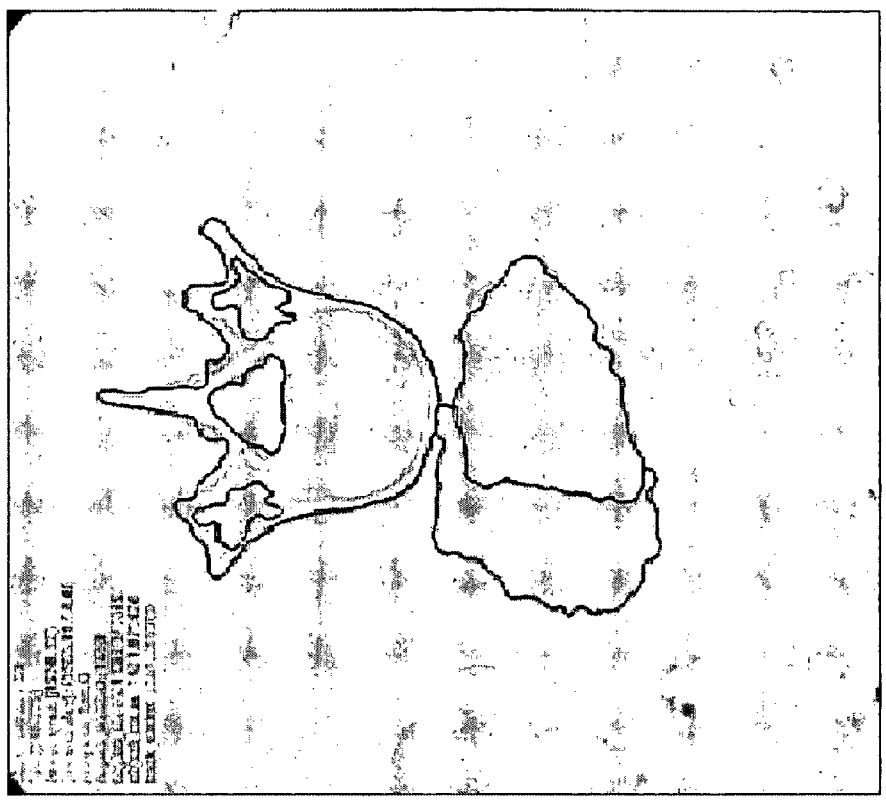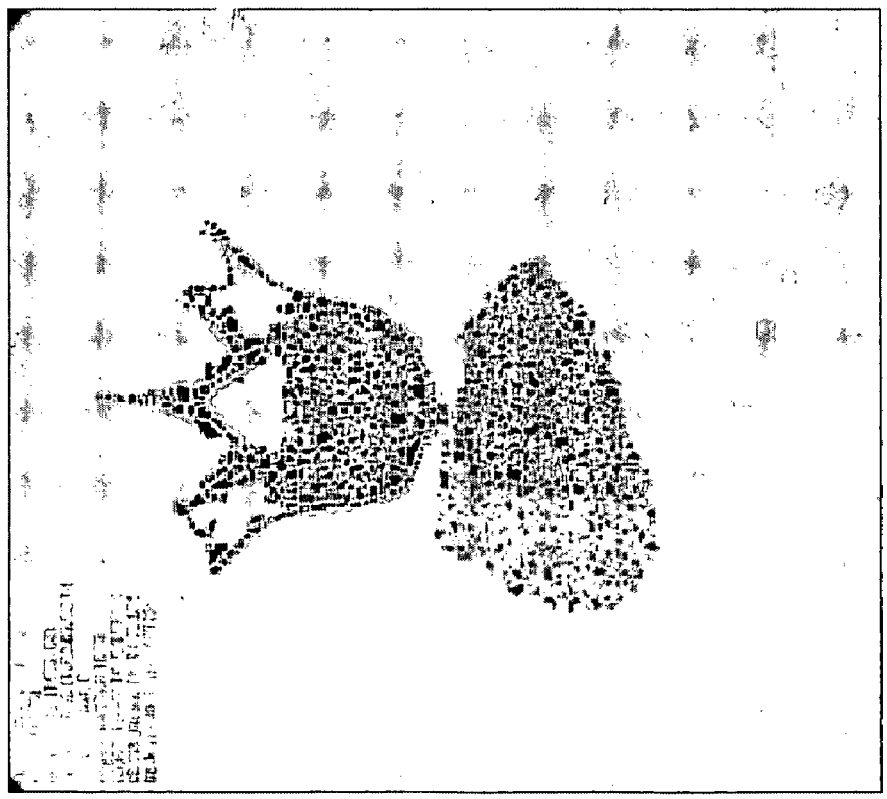
FIG. 6

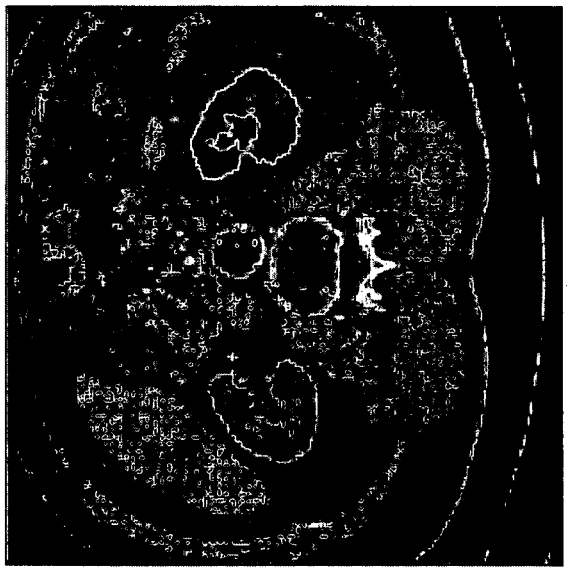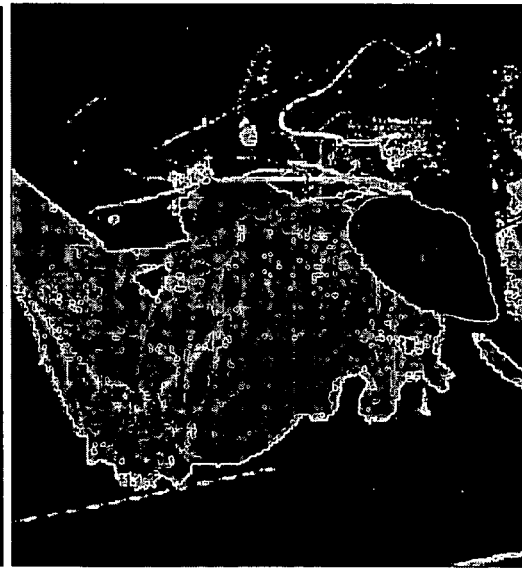
FIG. 11

REGION COMPETITION VIA LOCAL WATERSHED OPERATORS

CROSS-REFERENCE TO RELATED APPLICATIONS

This application claims priority to U.S. Provisional Application No. 60/625,991, which was filed on Nov. 8, 2004, and which is fully incorporated herein by reference.

BACKGROUND OF THE INVENTION

1. Field of the Invention

The present invention relates generally to the field of processor-based imaging, and, more particularly, to region competition via local watershed operators.

2. Description of the Related Art

The segmentation of structures in images is an inherently difficult and important problem. An exemplary but popular application of deformable models is in medical image analysis where the goal is often the extraction of a structure of interest from an image. In the early days of deformable models, the deformation of such models was often guided by differential structures such as edges as well as the internal forces such as elasticity and rigidity. In recent years, it has been proposed that active contours evolving with regional properties of images are less sensitive to the image noise and initial placement of contours. However, region-based deformable models often have difficulties in localizing object boundaries since incorporation of edge term into the evolution is quite difficult. In fact, the quality of results often is not satisfactory enough in many applications; for instance, quantification of medical structures requires very accurate detection of object boundaries.

Like deformable models, watershed transforms have also been very popular in medical image segmentation because they produce closed contours and give good performance at junctions and at places where the object boundaries are diffused. However, typical watershed segmentation produces a large number of regions for even simple images, which is known as the over-segmentation problem. This requires an additional technique, such as nonlinear smoothing filtering, region-growing techniques, and marker methods, to extract the boundaries of an object of interest.

Deformable models have also been used in the extraction of structures of interest on watershed maps. Such extraction requires that the watershed map of an image be computed a priori. However, most watershed methods are designed to operate on the whole image. Recent technological advances in imaging acquisition devices increase the spatial resolution of image data significantly. For example, new multi-detector CT machines can produce images with sizes greater than 1500×512×512. Thus, segmentation method for these data sets need to operate locally in order to be computationally efficient, i.e., rather limited amount of time and memory availability. While cropping data via user-defined region of interest may be solution for well localized pathologies, in many applications, e.g., vascular segmentation or bone removal in computed tomography angiography ("CTA"), the user-selected regions can still be very large. Alternatively, images are sometimes thresholded to reduce the area where the segmentation and visualization method need to operate possibly at the expense of removing anatomically important structures from the data.

SUMMARY OF THE INVENTION

In one aspect of the present invention, a method of segmenting an object from a structure of interest is provided. The method includes the steps of (a) receiving a user-selected point in an image; (b) performing a watershed transformation on the user-selected point to determine a primary object; and (c) adding a neighboring watershed region to the primary object based on region competition and a smoothness constraint to form an updated object.

In another aspect of the present invention, a machine-readable medium having instructions stored thereon for segmenting an object from a structure of interest is provided. The method includes the steps of (a) receiving a user-selected point in an image; (b) performing a watershed transformation on the user-selected point to determine a primary object; and (c) adding a neighboring watershed region to the primary object based on region competition and a smoothness constraint to form an updated object.

BRIEF DESCRIPTION OF THE DRAWINGS

The invention may be understood by reference to the following description taken in conjunction with the accompanying drawings, in which like reference numerals identify like elements, and in which:

FIG. 6 depicts illustrates images illustrating the segmentation of vessel lumen, thrombusus and spine in a CTA image, in accordance with one exemplary embodiment of the present invention;

FIG. 11 depicts a three-dimensional segmentation of the right kidney from a CTA image, in accordance with one exemplary embodiment of the present invention.

DETAILED DESCRIPTION OF PREFERRED EMBODIMENTS

Figure 1:
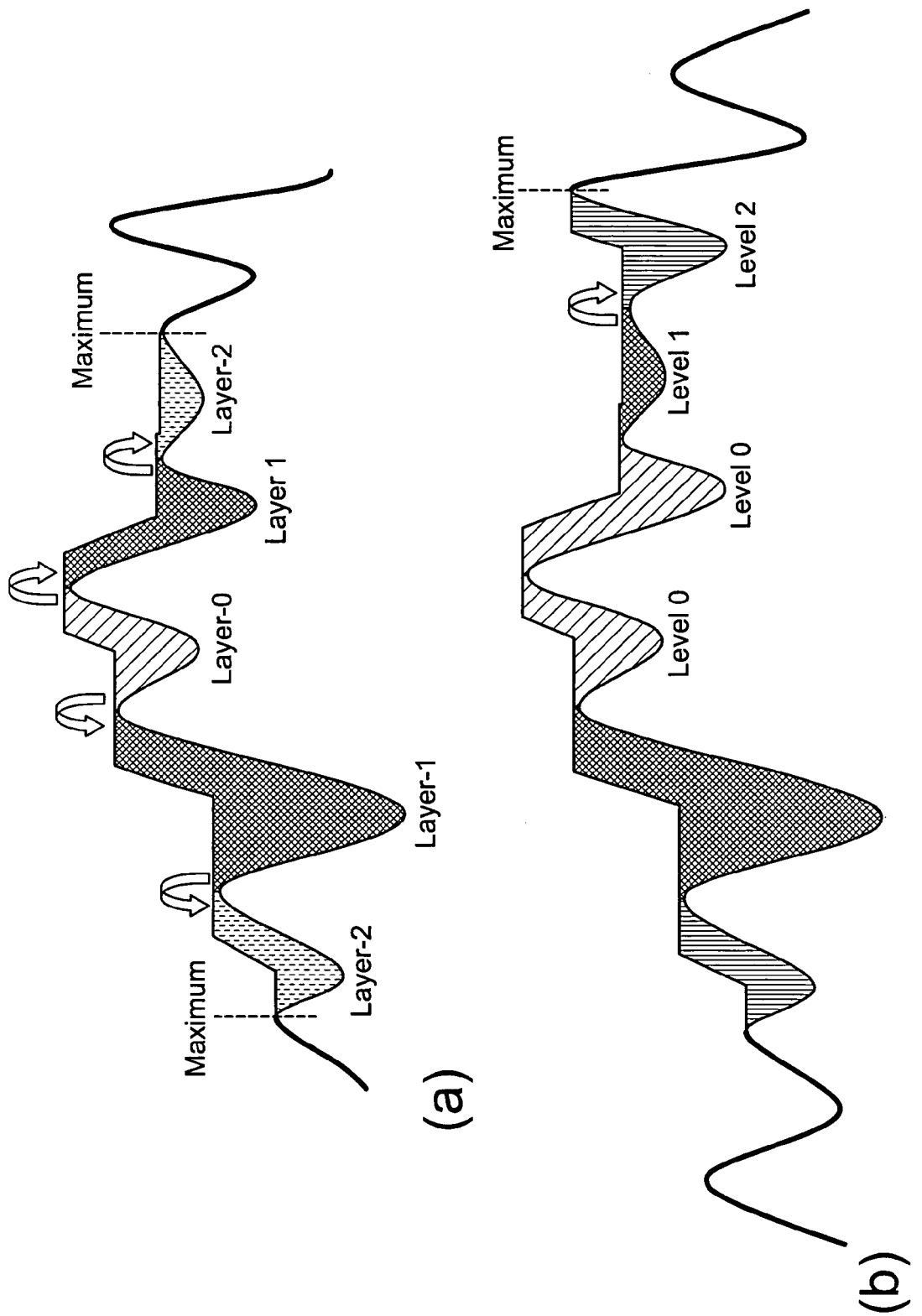
FIG. 1 depicts a one-dimensional representation of a three-layer basin filling method, in accordance with one exemplary embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

We present an exemplary segmentation method that combines a number of principles from local watershed transforms and region-based deformable models. Traditionally, watersheds are computed in the whole image, and then some region merging techniques are applied on the watersheds to reach the segmentation of structures. We propose using watershed regions as operators in region-based deformable models. These regions are computed only when the deformable models reach the regions. Then, the regions are added to (or subtracted from) the deformable models via a measure computed from two terms: (i) statistical fit of regions to the models (i.e., region competition); (ii) smoothness of such fits (i.e., smoothness constraint).

Specifically, a watershed map is constructed only in the vicinity of a deformable model via a local watershed method. Recall that watershed transforms produce regions whose boundaries coincide with edges in images. Thus, we propose that these regions can be used as operators in deformable models. In this paradigm, deformable models grow by the addition of regions, compete with each other for regions, and always stop at the edges. In other words, instead of using pixels in evolutions, our proposed primitives are regions that are computed locally. The growth and competition of deformable models are governed by the statistics of regions and also by the smoothness of deformable models during competition. Unlike traditional deformable models, which often use local curvature as smoothness constraint, we propose that the alignment of regions can be used to obtain smooth boundaries.

The proposed method is computationally efficient because it operates on regions instead of pixels. In addition, the proposed method allows better boundary localization due to the edge information brought by watersheds. Moreover, the proposed method can handle topological changes (e.g., split or merge) during the evolutions without an additional embedded surface as in the case of level-set formulation. Furthermore, structure-based smoothness of segmented objects is obtained by using the smoothness term computed from the alignment of regions. The efficiency and accuracy of the proposed technique is established on several medical data such as magnetic resonance angiography ("MRA") and computed tomography angiography ("CTA") data Previous Work In this section, we briefly review some of the previous work that is related to the novel methods presented herein, namely watershed transforms and region competition.

Watershed Transform: Watershed transform is a morphological gradient-based technique, which can be intuitively described as follows: View the gradient image as a height map, and gradually "immerse the gradient image in water," with water leaking through the minimum gradient points and rising uniformly and globally across the image. Place a "dam" when two distinct bodies of water (i.e., catchment basins) meet and continue the process until water has reached all the points of the image. The dams provide the final segmentation. This can be interpreted in the image domain as the growth of seeds placed on the minima of the image gradient height map at a time proportional to their height, that finally converges on the crest lines of the gradient map. This is a powerful approach especially where local gradients cannot be defined, e.g., diffused edges. Since most structures contain several catchment basins, a typical watershed segmentation produces a large number of regions for even simple images, which is known as the over-segmentation problem. Many of the regions can be effectively reduced via nonlinear smoothing filtering. The rest of the regions can be grouped with each other via region-growing techniques or marker methods.

Region Competition: Region competition combines the geometrical features of deformable models and the statistical nature of region growing, by using a combination of statistical and smoothing forces for seed growth. It also introduces a local competition between regions when the regions contact each other, by trading pixels that result in a decrease of energy, thus allowing recovery from errors. Specifically, let $R_i$, i=1, ... N denote N seed regions (i.e., objects) and one background region $R_B$. Let $\partial R_i$ be the boundary of region $R_i$, and let the intensity values in region $R_i$ be consistent with having been generated by a probability distribution $P(I|\alpha_i)$, where $\alpha_i$ are the parameters of the distribution. The local deformation at a point C on the boundary of a region $R_i$ consists of a smoothing force $\kappa \vec{N}$ and a statistical force $\log(P(I_C|\alpha_i))\vec{N}$, where $\kappa$ is the curvature at the boundary of the region, $I_C$ is the image at point C and $\vec{N}$ is the normal to the boundary. As a result of competition between two adjacent regions $R_i$ and $R_j$, the local deformations of their boundary are based on a single smoothing term for the boundary and a competition between the two statistical forces, leading to $$\frac{\partial C}{\partial t} = -\beta_1 \kappa \vec{N} + [\log(P(I_C \mid \alpha_i)) - \log(P(I_C \mid \alpha_j))]\vec{N} \quad (1)$$

where C is a point on the common boundary, $\alpha_i$ and $\alpha_j$ are parameters of the probability distribution describing the regions $R_i$ and $R_j$, respectively, and $\beta_i$ is a constant. Region competition implements a back and forth competition between adjacent regions, which is continued to convergence. After convergence, two adjacent regions are merged if the merge leads to an energy decrease; in this case, the competition resumes and is continued until a final convergence resulting in the final segmentation. Region competition is a powerful technique that works well in a wide variety of images, including those with diffused or weak edges between noisy regions.

Local Watershed Operators

H. Tek et al., Local watershed operators for image segmentation, *In Medical Image Computing and Computer-Assisted Intervention MICCAI*, pages 127-134, 2004 (hereinafter referred as "TEK1"), which is incorporated by reference herein in its entirety, presented a method for computing watershed transform of an image locally. This method is based on filling a region from a user-selected point. Specifically, the main goal is to fill a basin and compute its boundaries correctly and locally. This goal is satisfied via filling the main region (user-selected) and its immediate neighboring regions simultaneously via a three-layer basin filling method.

Three-Layer Basin Filling: The three-layer basin filling method simulates the water filling process from a user-selected point. While water continuously rises during the process of filling a basin, the water level also drops to a new minima when a new neighboring basin is needed to be filled. Specifically, an extra two layers must be filled simultaneously for the correct determination of the first region. The first two inner regions initialize the neighboring regions whenever they reach to the first watershed line that they share with their neighbors, thereby allowing simultaneous filling and correct determination of watershed lines between them. On the other hand, outer regions build dams wherever there are new regions. We now summarize an exemplary three-layer basin filling method, in accordance with one embodiment of the present invention.

First, the user-selected region is marked as LayerZero. The minimum height value of this region is determined with a gradient descent method. Then, this region is filled with water starting from this minimum. The filling process is implemented via region-growing type operators and bucket-based queuing for computational efficiency. Queuing is necessary for simulating the water rise. Specifically, the method starts from the minimum point and visit its eight neighbors in 2D (twenty-six neighbors in 3D) and puts them into buckets based on their height function. Then, the pixel with the minimum value is removed from the bucket for further growing. This growth process continues until a lower height value is encountered, i.e., a neighboring region. FIG. 1(*a*) illustrates a three-layer (i.e., Layer-0, Layer-1, Layer-2) representation in one-dimension ("1D").

Specifically, when the water level from LayerZero reaches the ridges (i.e., watershed lines), the minimum value of this neighboring region is computed via a gradient descent method. If no region is already initialized from this minima, a new region from this location is initialized and marked as LayerOne. Then, the water level is reduced to this minima and the filling process is restarted from there. It should be noted that the growth process takes place from pixels obtained from buckets; thus, different regions are filled simultaneously. When water from two different neighboring regions, namely LayerZero and LayerOne reaches their boundaries, i.e., watershed lines are marked as the boundaries of regions.

Similar to LayerZero regions, LayerOne regions detect their outer neighbors when water from them reaches the ridges and does not collide with water from other regions. In this case, again, the minima of this new region is computed. If this minima does not belong to any region, it is marked as LayerTwo region and the water level is reduced to the height value of the location. Observe that the filling process is exactly the same for the LayerZero and LayerOne regions. However, LayerTwo regions do not initialize their outer neighboring regions when they detect them. Instead, dams are constructed to stop the water flowing into those neighboring regions. These dams correspond to the maxima points of the LayerTwo regions and are stored in a maxima list. In addition, these dams are not inserted to the buckets, i.e., no more growing from LayerTwo regions and corresponds to the boundaries of LayerTwo regions. TEK1 shows that this filling process from LayerTwo prevents passing through narrow regions, necks or protrusions. Thus, LayerTwo basins cannot be correctly determined, which is the main reason for the three-layer representation. This filling method continues until no pixels are left in the buckets. Now, the main region (user-selected) is correctly determined from this three-layer basin filling method.

Figure 2:
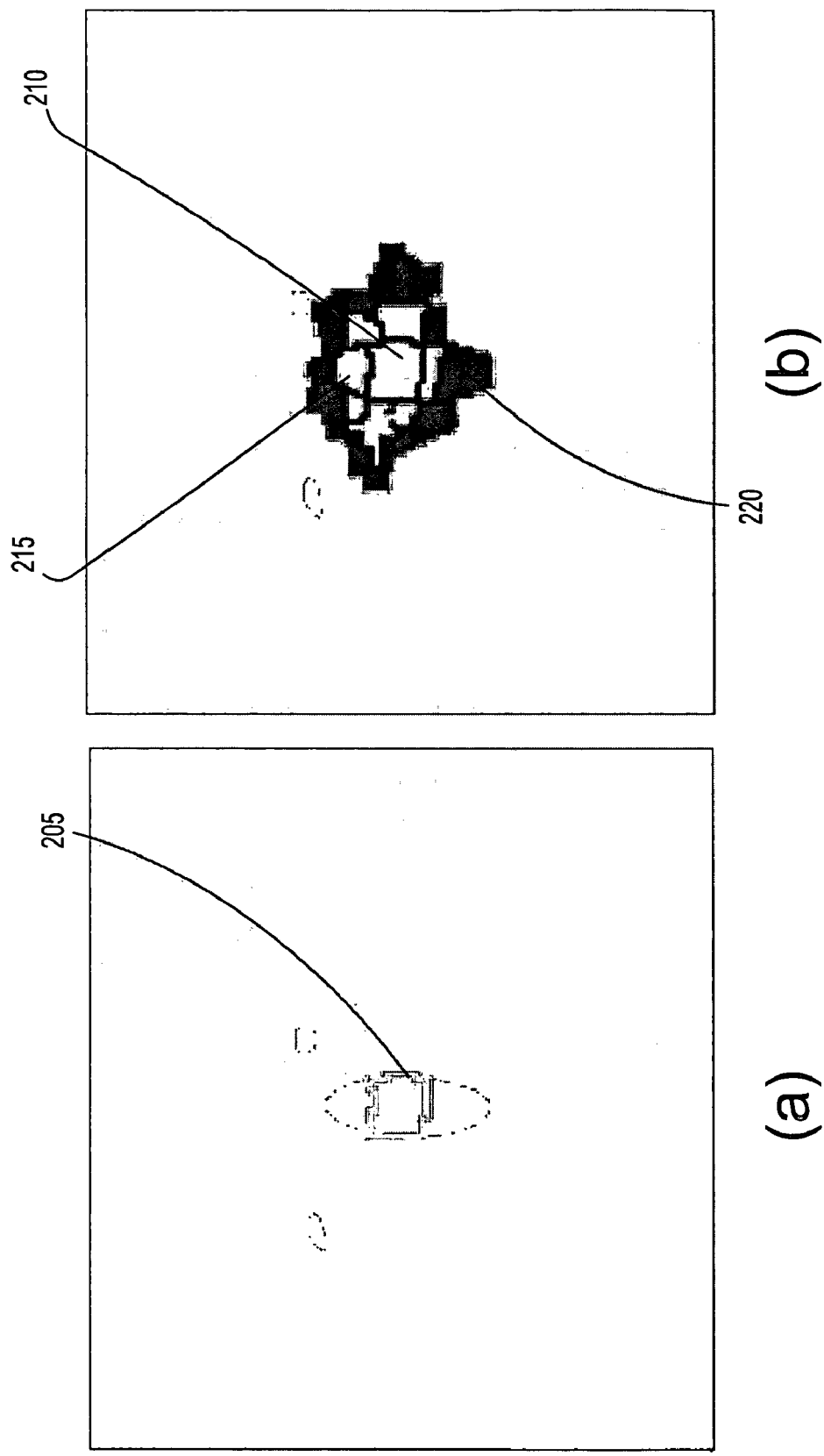
FIG. 2 depicts images illustrating the results of a three-layer local watershed method, in accordance with one exemplary embodiment of the present invention.

FIG. 2 illustrates the result of forming one basin via this watershed method. Specifically, the user places a seed in the image which corresponds to a basin (i.e., region), as shown by the contour 205 in FIG. 2(*a*). The neighboring regions namely LayerZero 210, LayerOne 215, and LayerTwo 220 are illustrated in FIG. 2(*b*). The LayerOne 215 and LayerTwo 220 regions are necessary to extract the basin (i.e., region) of interest, which is the LayerZero 210 region in FIG. 2. It should be noted that a plateau, a local flat region, between two or more regions requires extra care and they are partitioned by using the distance transforms.

Watershed Operators: A single watershed region rarely corresponds to a structure in an image. Additional regions must be merged to this region to form a meaningful structure. This can be implemented by merging neighboring regions and computing their neighboring regions iteratively. Specifically, first, one of the LayerOne regions is merged to the LayerZero basin via some merging criterion, e.g. thresholding. Observe that now LayerZero regions include more than one region. Second, all the neighboring LayerTwo regions of the merged LayerOne region are updated to LayerOne status. Third, the filling process is restarted from the minimum point of the previous LayerTwo regions' maxima list for new LayerTwo regions. Starting the filling process from the minima of the maxima list may cause some areas of LayerTwo regions to be processed again, but it is important to lower the water level to the place where the first maximum was marked. This allows the method to initialize the neighbors of the previous Layer Two regions (converted to LayerOne after merging) as LayerTwo regions, thereby avoiding the neck problem. The filling process continues until there are no more pixels left in the buckets. These merging and filling processes define an addition operator. FIG. 1(*b*) illustrates an addition operator described by first merging LayerOne region to LayerZero, and then filling a new region. Similarly, a deletion operator can be described as removing a region from LayerZero region and updating the neighboring information accordingly. However, no new watershed regions need to be computed in this case. These watershed operators, namely addition and deletion, are used as basis in the segmentation processes, which will be described in the next section.

Watershed-Based Region Competition

In medical images, the main objective is often the extraction of a single structure from its surrounding structures. In other words, the full image segmentation is desirable but not necessary for many applications. For example, diagnosis of pathologies in vascular structures in MRA or CTA requires accurate segmentation of blood vessels. However, segmentation of other structures may not be as important in such specific applications. Thus, we propose herein a segmentation technique that aims to extract user-selected structure of interests. The proposed method is based on region competition and local watershed method.

Figure 3:
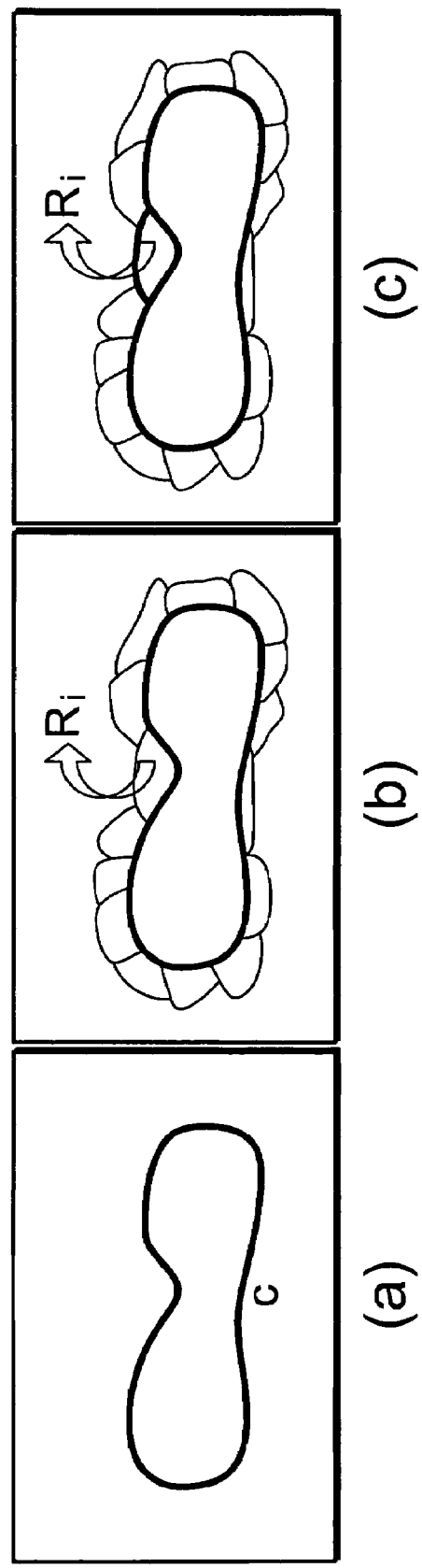
FIG. 3 depicts a sequence of images illustrating the deformation of a contour C using regions computed via local watershed operators, in accordance with one exemplary embodiment of the present invention.

In existing region competition methods, the regions compete for pixels based on the statistics of regions and the smoothness constraints at pixels. We propose herein that regions, which are extracted by the local watershed method be used in region competition instead of pixels. Specifically, consider a closed curve C representing a deformable model, as illustrated in FIG. 3(a). FIG. 3(a) illustrates a curve C representing an object O. In general, deformable models can be represented explicitly or implicitly such as level sets. Here, the curve C is represented by discrete pixels which correspond to the boundaries between regions. In other words, the curve C is always located at the watershed lines separating neighboring regions. Thus, it separates regions that fall inside the contour and the regions that fall outside it. The main idea behind region competition here is to find watershed lines (corresponding curve C) that best separate the image locally in terms of image statistics.

Let us first consider that the given image contains one structure and background. The curve C at a given time is surrounded by outside regions Ri surrounding the curve C and inside regions inside the curve C. FIG. 3(b) illustrates the curve C of FIG. 3(a) surrounded by outer regions Ri. Observe that the curve C actually represents the boundaries of the object which consists of inner regions. Similarly, the background (i.e., the area of the image surrounding the object) corresponds to the regions outside the curve C. In this scenario, the curve grows by adding outer regions into itself, which are statistically closer to itself than background. Similarly, background tries to take regions from object. FIG. 3(c) illustrates the curve of FIG. 3(a) is deformed by adding the region Ri to object. Thus, in the instant exemplary method, objects and background compete for the regions outside and inside the curve C. It should be noted that these regions are constructed only in the vicinity of curve C by local watersheds, thereby saving a substantial amount of computation in large data sets. A region Ri is added to object if it is statistically more similar to the object than background. The statistical similarity between region Ri and object O, $S_{ORi}$ is given by $$S_{ORi} = \frac{1}{\sqrt{2\pi\sigma_O^2}} e^{-\frac{(\mu_{Ri}-\mu_O)^2}{2\sigma_O^2}} \quad (2)$$

where $\mu_{Ri}$, $\mu_O$ are the mean of region Ri, and object O respectively; and $\sigma_O$ is the standard deviation of object O. The statistical similarity between region Ri and background B, $S_{BRi}$ can be computed similarly, i.e., $$S_{BRi} = \frac{1}{\sqrt{2\pi\sigma_B^2}} e^{-\frac{(\mu_{Ri}-\mu_B)^2}{2\sigma_B^2}} \quad (3)$$

The region Ri is added to object O if its is more similar to object than background B, i.e., $S_{ORi} > S_{BRi}$. If $S_{ORi} < S_{BRi}$ then $R_i$ is added to background B.

We will now describe the instant exemplary method in terms of implementation. The user selects a region of interest that corresponds to the part of the structure of interest. The local watershed map of user-selected area is constructed. The curve C representing boundaries of object O lies at the watershed lines of LayerZero regions described in greater detail above. At this stage, boundary regions of object O is determined from the LayerOne regions of local watershed map. These are the regions where object O can grow into. These regions are then stored in the object O structure. The initial statistics of object O is determined from the statistics of LayerZero regions. The background statistics are constructed from the outside areas of the object O if the image (or cropped image around the user-selected region) does not contain any other structures. However, background statistics can also be constructed from areas which may be marked by user as well. In fact, this is necessary if an image contains more than one structure. Otherwise, region competition cannot produce desirable results. The statistical similarity of each boundary region Ri to the object O, $S_{ORi}$ and background B, $S_{BRi}$ is computed. If $S_{ORi} > S_{BRi}$, region Ri is added to object O and its neighboring watershed regions are computed, if necessary, and the LayerOne regions are marked as the boundary regions of object. If $S_{ORi} < S_{BRi}$ region Ri is added to background B and again its neighboring watershed regions are computed, if necessary, and LayerOne regions are marked as the boundary region of background. The instant method terminates when neither the background nor the object is able to add any of the boundary regions to itself.

Figure 4:
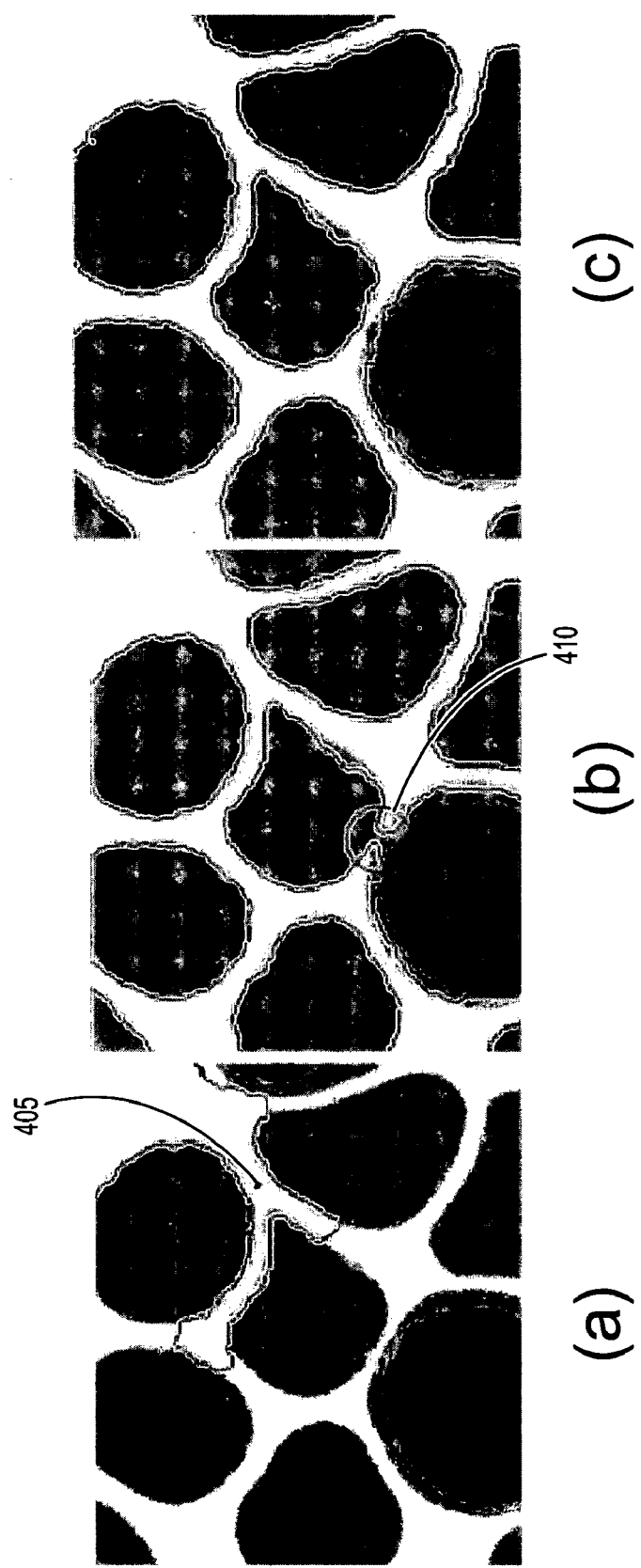
FIG. 4 depicts the segmentation of cells, in accordance with one exemplary embodiment of the present invention.

Observe that during the growth of the object O, the background region can form independently. This is necessary because the structure of interest may have holes (i.e., areas that are more similar to background). Thus, in this proposed method, topological changes should occur. In fact, as with level sets, the instant method can segment multiple objects by splitting. This is one of the important properties of the instant method. FIG. 4 illustrates the segmentation of cells via the proposed method. In particular, FIG. 4 illustrates that topological changes in the deformation of a curve via watershed regions is handled naturally. As shown in FIG. 4(a), the user initializes a seed 405 in a bright region. FIG. 4(b) specifically marks with a circle 410 in one of the places where the object splits into parts. FIG. 4(c) illustrates the final segmentation result. While the topological changes are handled naturally in level-set evolutions at expense of additional embedded surface, in this proposed method, where the boundary is explicitly represented via discrete pixels, no additional processing or storage is necessary for topological changes.

Figure 5:
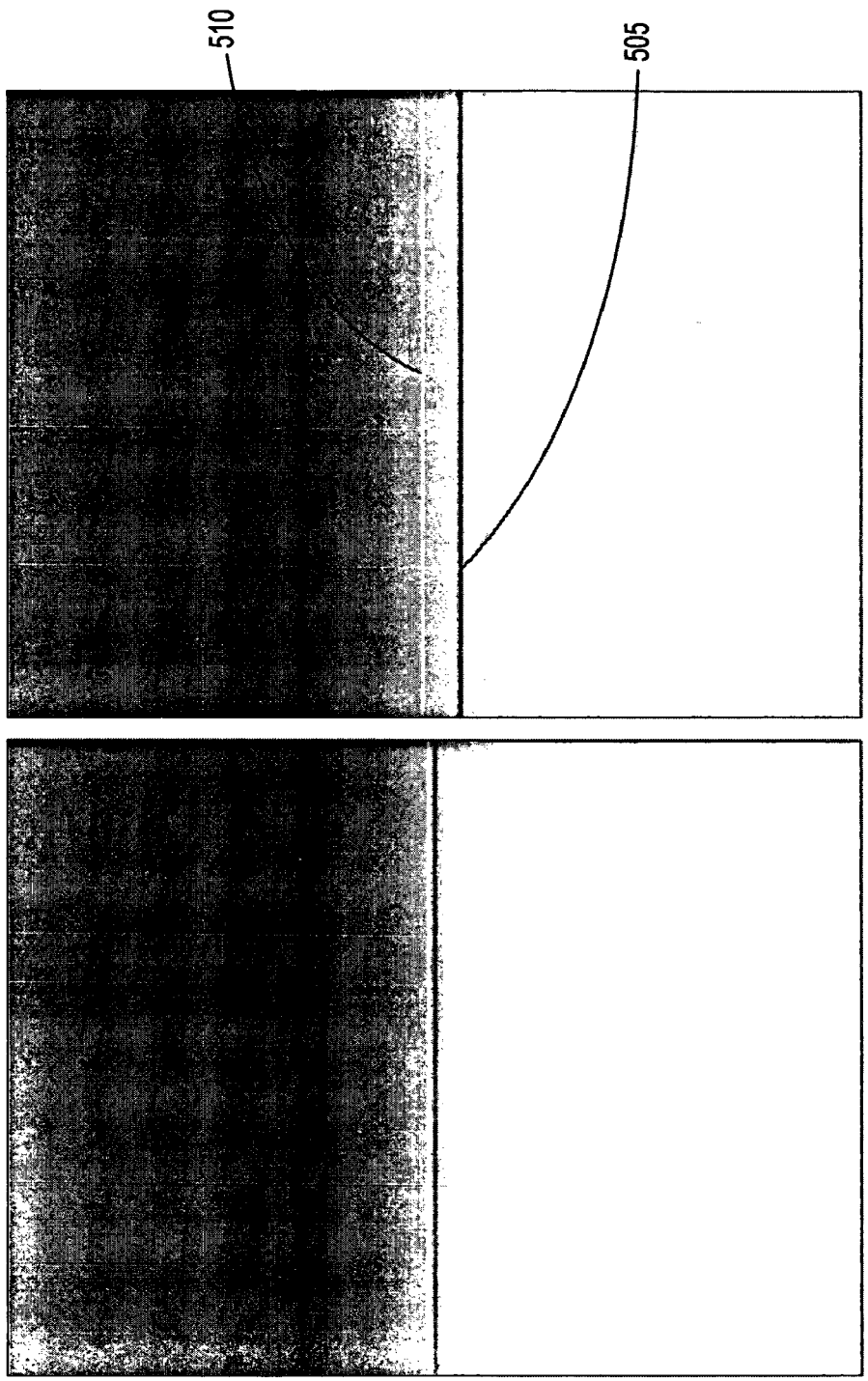
FIG. 5 depicts the traditional region competition methods versus region competition via local watershed operators, in accordance with one exemplary embodiment of the present invention.

Although region-based deformable models such as region competition are stable in terms of initial seed placement, the converge of object boundaries cannot be guaranteed to fall onto real boundaries of the objects since convergence is determined via statistical properties. For example, FIG. 5 illustrates that the traditional region competition method is not able to converge at the edges of two neighboring regions. However, it is possible to segment the same image correctly with the proposed watershed-based region competition method because the instant method always converges at the edges. Thus, the instant method is able to integrate edge and regional information in certain areas. FIG. 5(a) shows a synthetic image, in which both traditional region competition methods (implemented by pixel-based representations and level set evolutions) and the instant method converge exactly at the edge. FIG. 5(b) shows that when a brighter layer is added to a lower part of the image (i.e., the bright region) the traditional region competition methods converge away from the real edge 505 because the mean of the bright region is increased, thereby moving the statistical boundary down. On the other hand, the instant method still converges at the true edge 510.

We would expect that incorporation of edge information via watershed regions can improve the quality of results in diffused edges where watershed regions are usually large, thereby allowing correct convergence.

Multi-Structure Extraction and Smoothness

In images, a structure of interest is often surrounded by other structures as well as background, thus the robust segmentation often requires that the nearby structure be segmented simultaneously. While we have described the instant method for bi-modal images where the structure of interest is surrounded by only background, it is possible to segment more than one structure with the current approach. Specifically, the user can place seeds for each structure. Then each object representing a different structure is given a different label. In the case of multiple objects, region competition takes place between different objects and background. Specifically, consider an exemplary image containing M objects. The region $R_i$ is added to object $O_k$ if $S_{O_kR_i}$ is the maximum for k=1, . . . M and Ri is the neighboring region of object $O_k$. In other words, while we allow the neighboring regions of objects become background, i.e. background areas can form inside objects, the region $R_i$ cannot be added to the $O_k$ if Ri is not a neighboring region of $O_k$. When objects with different types collide with each other they do not merge and stay as different objects. However, the collision of the same type of objects leads to merge of those objects. By different "types" of objects, we are generally referring to different structures within an image that a user may be interested in segmenting simultaneously. For example, an exemplary medical image may include a liver, a tumor and a background, each of which may be a type. FIG. 6 shows an example, illustrating the segmentation of vessel lumen, thrombusus and spine in a CTA image using the instant method. FIG. 6(a) illustrates the watershed regions, and FIG. 6(b) illustrates the boundaries.

In general, region competition works well in cases where the structure of interest is statistically well separated from its surroundings. However, often object boundaries are diffused and noisy; thus, the statistical difference between object and its surroundings can be very close to each other. In these cases, additional criteria should be added to the competition for better separation. In a deformable method, smoothness constraints play an important role for improving the accuracy of the results. The smoothness constraint is computed from the curvature of the evolving curve. Thus, the constraint is local and structure-based smoothing cannot be enforced.

Figure 7:
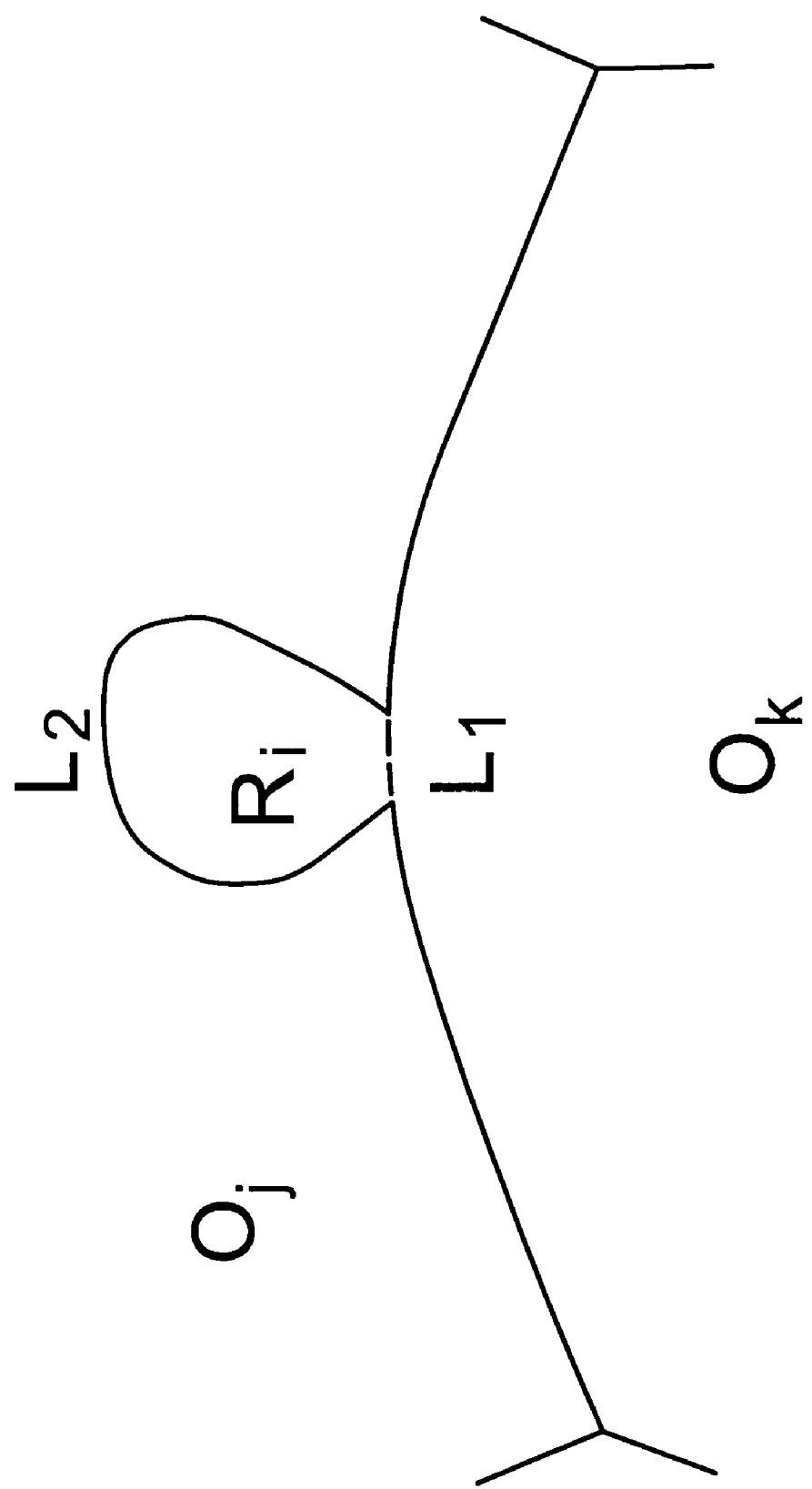
FIG. 7 depicts two objects, a region and two boundary lengths, in accordance with one exemplary embodiment of the present invention.

We propose herein that region separation can be improved by an additional smoothness force computed from the boundary of regions. Specifically, we expect that the addition of a region to an object should keep the boundary of the object compact. For example, the addition of region Ri to object $O_j$, as shown in FIG. 7, regularizes the boundary of object $O_j$, and should add strong support to the similarity term of region Ri to object $O_j$. FIG. 7 illustrates the importance of smoothness constraints. Observe that the addition of the region Ri to object $O_j$ should have a much higher smoothness force than its addition to object $O_k$. We use the length of the boundary, namely $L_1$ and $L_2$, to measure the smoothness term.

Specifically, we propose a boundary smoothness term by $$B_{O_jR_i} = \frac{L_2^2}{(L_1 + L_2)^2} \quad (4)$$

where $L_2$ corresponds to the length of boundary shared by the region $R_i$ and object $O_j$ and the $L_1$ corresponds to the remaining boundary length as illustrated in FIG. 7. Observe that the boundary smoothness term B changes between zero and one where one corresponds to much strong smoothness force.

Figure 8:
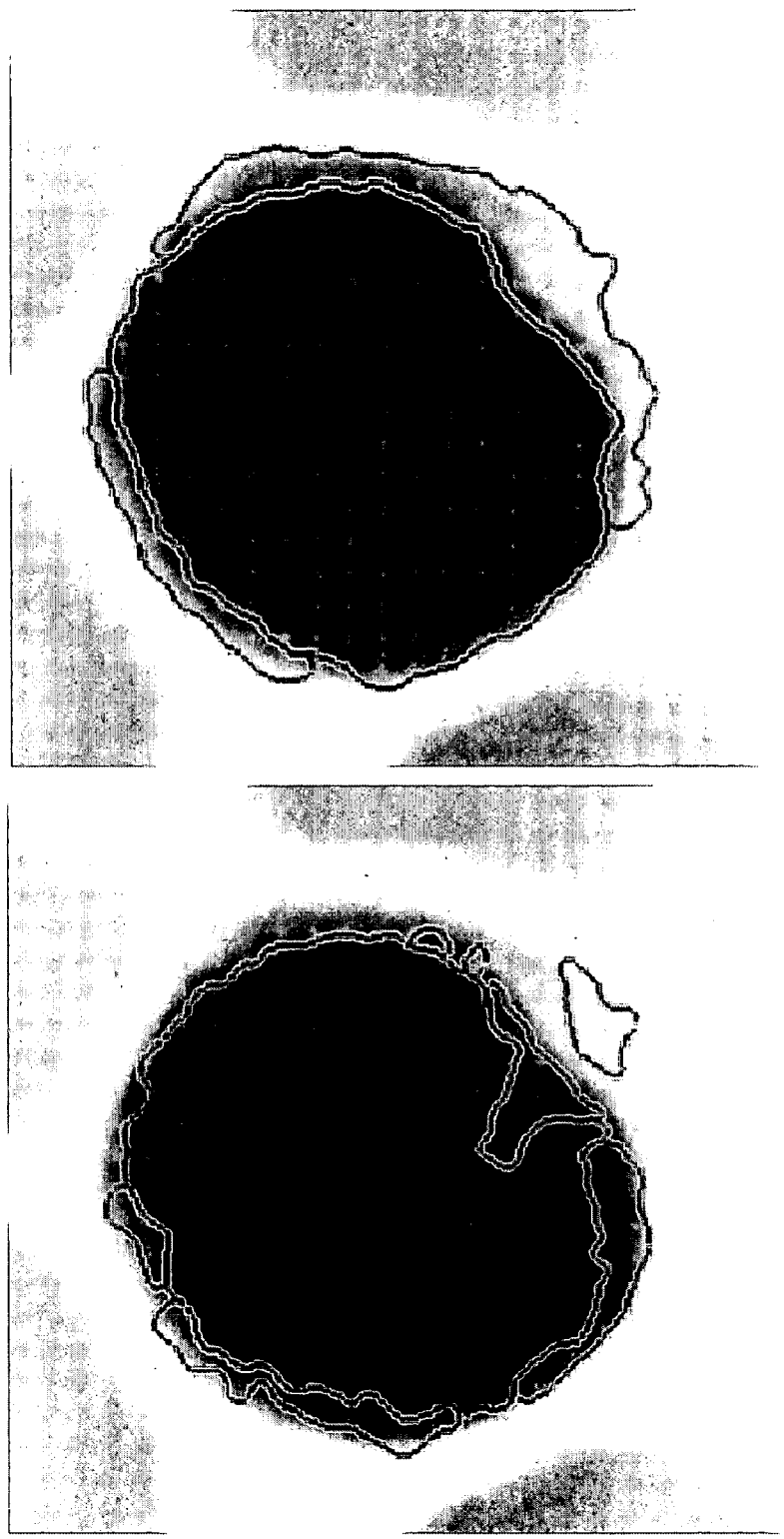
FIG. 8 depicts the segmentation of two neighboring structures with and without smoothness constraints, in accordance with one exemplary embodiment of the present invention.

We now consider the case when multi-objects compete for regions with the addition of boundary smoothness forces. Specifically, consider a region $R_i$ between objects $O_j$ and $O_k$ in FIG. 7. The total force on region $R_i$ is given by $$F_{R_i} = (S_{O_jR_i} - S_{O_kR_i}) + k(B_{O_jR_i} - B_{O_kR_i}) \quad (5)$$

where k is constant and determines the amount of smoothing force in region competition. Here, $R_i$ is added to object $O_j$ if $F_{R_i} > 0$ or to object $O_k$, otherwise. FIG. 8 shows an example where two objects are segmented without smoothness constraints and with smoothness constraints. FIG. 8(a) illustrates the segmentation of two neighboring structures without smoothness constraints, and FIG. 8(b) illustrates the segmentation of two neighboring structures with smoothness constraints.

Figure 9:
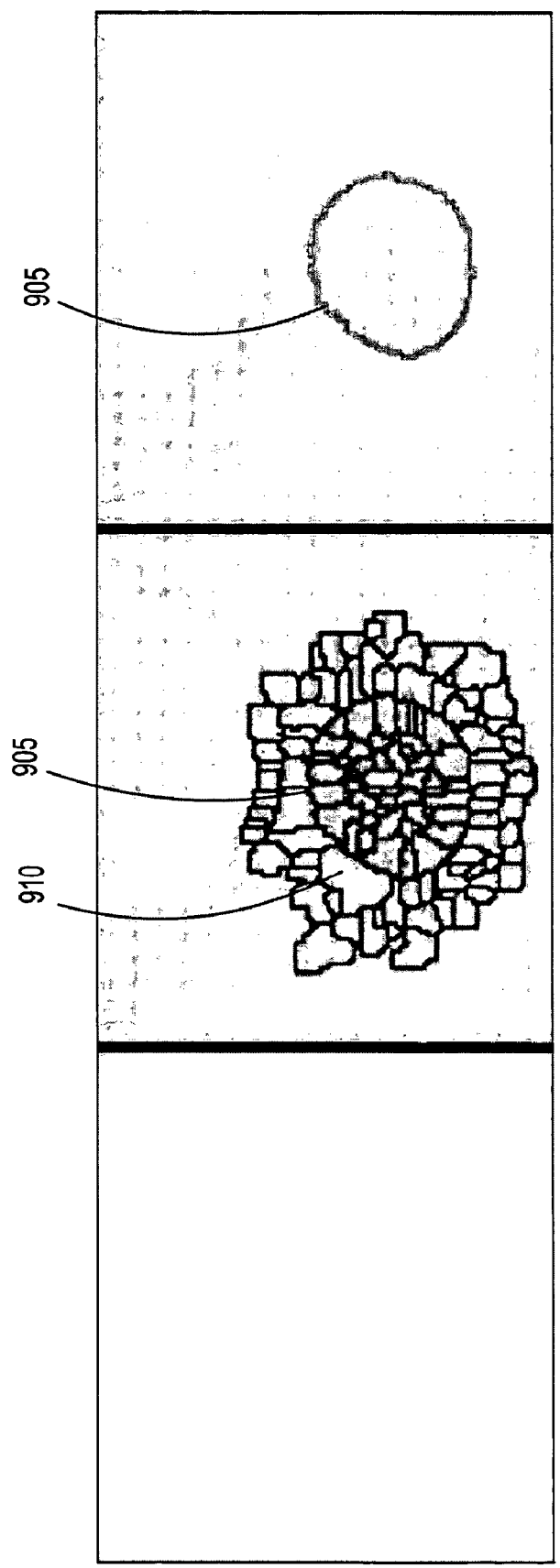
FIG. 9 depicts the results of seeded region competition, in accordance with one exemplary embodiment of the present invention.
Figure 10:
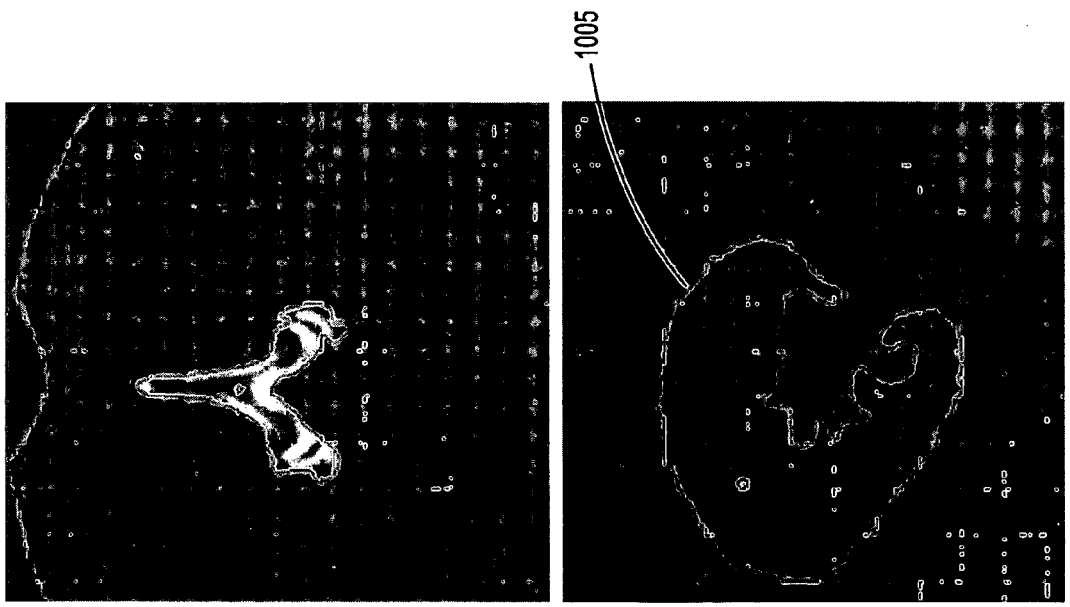
FIG. 10 depicts the segmentation of a medical structure, in accordance with one exemplary embodiment of the present invention.

FIGS. 9 and 10 show exemplary applications of the instant method on medical images. FIG. 9 illustrates the segmentation of a vessel boundary (i.e., aorta) 905 in an orthogonal view. It also shows other regions 910 which are explored during the competition. The seed point is given by the user (or from a vessel centerline model) inside the aorta. Observe that the full watershed map is not constructed.

FIG. 10 illustrates the segmentation of a structure 1005 in a CTA image data. In the case shown in FIG. 10, the user places a seed inside the structure of interest. FIG. 11 shows the three-dimensional ("3D") segmentation of the right kidney 1105 from a CTA image. FIG. 11(a) shows the results overlayed on a single slice. FIG. 11(b) shows a 3D visualization of a segmented kidney in volume rendering.

Figure 12:
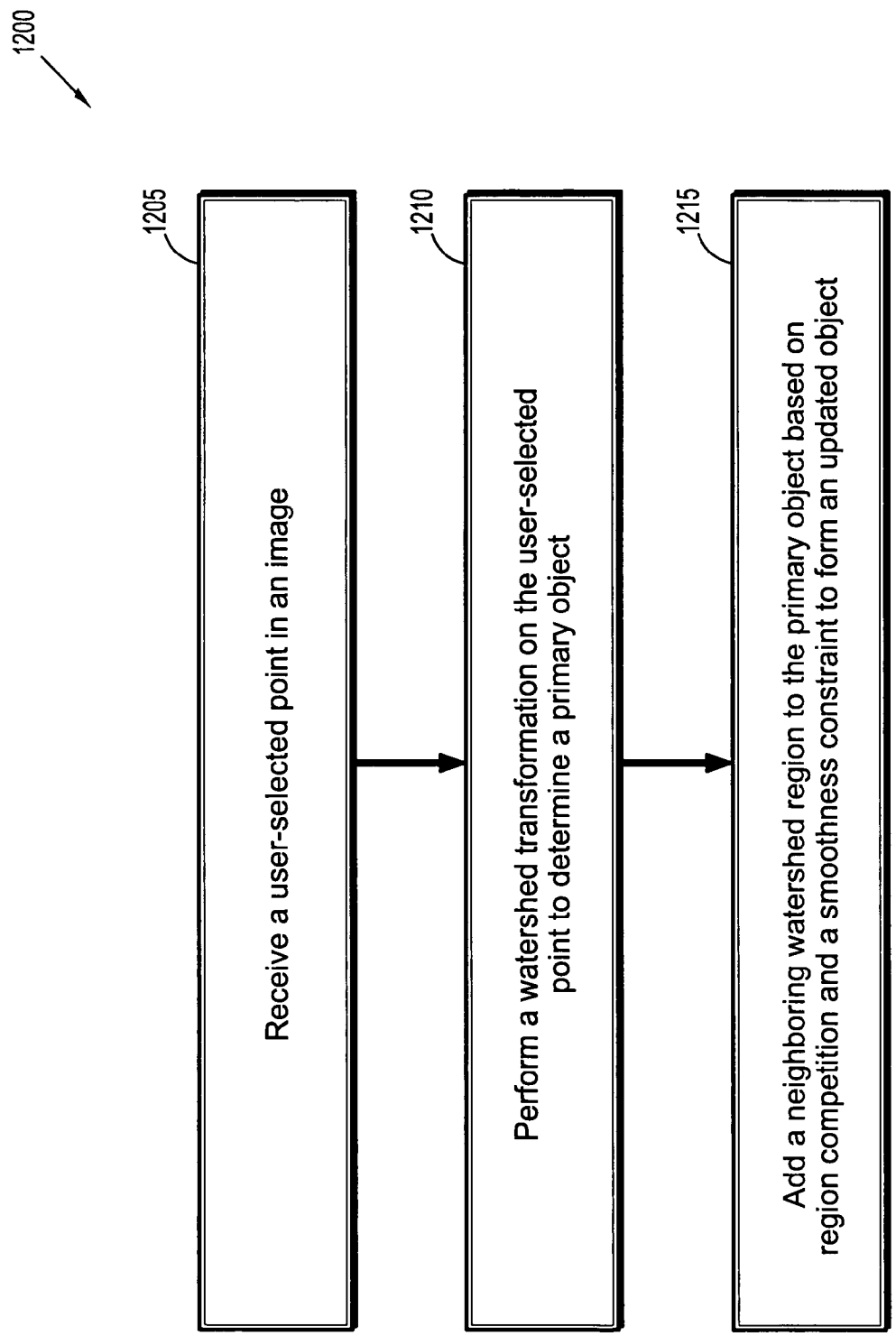
FIG. 12 depicts a flow diagram illustrating an exemplary method of segmenting an object from a structure of interest, in accordance with one embodiment of the present invention.

FIG. 12 depicts a flow diagram 1200 illustrating an exemplary method of segmenting an object from a structure of interest. A user-selected point in an image is received (at 1205). A watershed transformation is performed (at 1210) on the user-selected point to determine a primary object. A neighboring watershed region is added (at 1215) to the primary object based on region competition and a smoothness constraint to form an updated object.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of segmenting an object from a structure of interest, comprising:

(a) receiving a user-selected point in an image;

(b) performing a watershed transformation on the user-selected point to determine a primary object;

(c) adding a neighboring watershed region to the primary object based on region competition and a smoothness constraint to form an updated object;

determining a first statistical similarity between the neighboring watershed region and the primary object;

determining a second statistical similarity between the neighboring watershed region and a secondary object in the image;

determining a first boundary smoothness term between the primary object and the neighboring watershed region;

determining a secondary boundary smoothness term between the secondary object and the neighboring watershed region; and adding the neighboring watershed region to the primary object based on the first statistical similarity, the second statistical similarity, the first boundary smoothness term, and the second boundary smoothness term.

2. The method of claim 1, further comprising:

(d) successively determining additional watershed regions that neighbor the neighboring watershed region; and (e) successively adding the additional watershed regions to the updated object based on the region competition and the smoothness constraint;

wherein the steps of (d) and (e) are repeated until the additional watershed regions are unavailable to be added.

3. The method of claim 1, wherein the secondary object comprises a background of the image.

4. The method of claim 1, wherein the step of determining a first statistical similarity between the neighboring watershed region and the primary object, comprises:

computing $$S_{O_k R_i} = \frac{1}{\sqrt{2\pi\sigma_{O_k}^2}} e^{-\frac{(\mu_{Ri}-\mu_{O_k})^2}{2\sigma_{O_k}^2}}$$

wherein $\mu_{Ri}$ is the mean of $R_i$, $\mu_O$ is the mean of primary object $O_j$, and $\sigma_{O_j}$ is the standard deviation of primary object $O_j$.

5. The method of claim 1, wherein the step of determining a second statistical similarity between the neighboring watershed region and a secondary object of the image, comprises:

computing $$S_{O_j R_i} = \frac{1}{\sqrt{2\pi\sigma_{O_j}^2}} e^{-\frac{(\mu_{Ri}-\mu_{O_j})^2}{2\sigma_{O_j}^2}}$$

wherein $\mu_{Ri}$ is the mean of $R_i$, $\mu_{O_k}$ is the mean of secondary object $O_k$, and $\sigma_{O_k}$ is the standard deviation of secondary object $O_k$.

6. The method of claim 1, wherein the step of determining a first boundary smoothness term between the primary object and the neighboring watershed region, comprises:

computing $$B_{O_j R_i} = \frac{L_2^2}{(L_1+L_2)^2}$$

wherein $L_2$ corresponds to a length of a boundary shared by the region $R_i$ and primary object $O_j$ and the $L_1$ corresponds to the remaining length of the boundary.

7. The method of claim 1, wherein the step of determining a secondary boundary smoothness term between the secondary object and the neighboring watershed region, comprises:

computing $$B_{O_k R_i} = \frac{L_2^2}{(L_1+L_2)^2}$$

wherein $L_2$ corresponds to a length of a boundary shared by the region $R_i$ and primary object $O_k$ and the $L_1$ corresponds to the remaining length of the boundary.

8. The method of claim 1, wherein the step (c) of adding a neighboring watershed region to the primary object based on region competition and a smoothness constraint to form an updated object, comprises:

computing a total force on the neighboring watershed region; and adding the neighboring watershed region to one of the primary object or the secondary object based on the total force.

9. A method of segmenting an object for a structure of interest comprising:

(a) receiving a user-selected point in an image;

(b) performing a watershed transformation on the user-selected point to determine a primary object;

(c) adding a neighboring watershed region to the primary object based on region competition and a smoothness constraint to form an updated object;

determining a first statistical similarity between the neighboring watershed region and the primary object; and wherein the step (c) of adding a neighboring watershed region to the primary object based region competition and a smoothness constraint to form an updated object, comprises:

computing a total force on the neighboring watershed region; and adding the neighboring watershed region to one of the primary object or the secondary object based on the total force;

wherein the step of computing a total force on the neighboring watershed region, comprises:

computing $$F_{R_i}=(S_{O_j R_i}-S_{O_k R_i})+k(B_{O_j R_i}-B_{O_k R_i})$$

wherein $S_{O_j R_i}$ is a first statistical similarity between the primary object $O_j$ and the neighboring watershed region Ri, $S_{O_k R_i}$ is a second statistical similarity between the secondary object $O_k$ and the neighboring watershed region Ri, $B_{O_j R_i}$ is a first boundary smoothness term between the primary object $O_j$ and the neighboring watershed region Ri, $B_{O_k R_i}$ is a second boundary smoothness term between the secondary object $O_k$ and the neighboring watershed region Ri, and k is a constant determining an amount of smoothing force in region competition.

10. The method of claim 9, wherein the step (c) of adding a neighboring watershed region to the primary object based on region competition and a smoothness constraint to form an updated object, comprises:
adding a neighboring watershed region to the primary object if the total force $F_{R_i}$ on the neighboring watershed region is greater than zero.

11. The method of claim 1, wherein the step (c) of adding a neighboring watershed region to the primary object based on region competition and a smoothness constraint to form an updated object, comprises:
adding a neighboring watershed region to the secondary object if a total force $F_{R_i}$ on the neighboring watershed region is less than or equal to zero.

12. A computer-readable medium having instructions stored thereon for segmenting an object from a structure of interest, the method comprising:
(a) receiving a user-selected point in an image;
(b) performing a watershed transformation on the user-selected point to determine a primary object; and
(c) adding a neighboring watershed region to the primary object based on region competition and a smoothness constraint to form an updated object;
wherein the step (C) comprises:
determining a first statistical similarity between the neighboring watershed region and the primary object;
determining a second statistical similarity between the neighboring watershed region and a secondary object in the image;
determining a first boundary smoothness term between the primary object and the neighboring watershed region;
determining a secondary boundary smoothness term between the secondary object and the neighboring watershed region; and
adding the neighboring watershed region to the primary object based on the first statistical similarity, the second statistical similarity, the first boundary smoothness term, and the second boundary smoothness term.

13. The method of claim 12, further comprising:
(d) successively determining additional watershed regions that neighbor the neighboring watershed region; and
(e) successively adding the additional watershed regions to the updated object based on the region competition and the smoothness constraint;
wherein the steps of (d) and (e) are repeated until the additional watershed regions are unavailable to be added.

14. The method of claim 12, wherein the secondary object comprises a background of the image.

15. The method of claim 12, wherein the step of determining a first statistical similarity between the neighboring watershed region and the primary object, comprises:
computing $$S_{O_j R_i} = \frac{1}{\sqrt{2\pi\sigma_{O_j}^2}} e^{\frac{(\mu_{Ri} - \mu_{O_j})^2}{2\sigma_{O_j}^2}}$$

wherein $\mu_{Ri}$ is the mean of $R_i$, $\mu_O$ is the mean of primary object $O_j$, and $\sigma_{O_j}$ is the standard deviation of primary object $O_j$.

16. The method of claim 12, wherein the step of determining a second statistical similarity between the neighboring watershed region and a secondary object of the image, comprises:
computing $$S_{O_k R_i} = \frac{1}{\sqrt{2\pi\sigma_{O_k}^2}} e^{\frac{(\mu_{Ri} - \mu_{O_k})^2}{2\sigma_{O_k}^2}}$$

wherein $\mu_{Ri}$ is the mean of $R_i$, $\mu_{O_k}$ is the mean of secondary object $O_k$, and $\sigma_{O_k}$ is the standard deviation of secondary object $O_k$.

17. The method of claim 12, wherein the step of determining a first boundary smoothness term between the primary object and the neighboring watershed region, comprises:
computing $$B_{O_j R_i} = \frac{L_2^2}{(L_1 + L_2)^2}$$

wherein $L_2$ corresponds to a length of a boundary shared by the region $R_i$ and primary object $O_j$ and the $L_1$ corresponds to the remaining length of the boundary.

18. The method of claim 12, wherein the step of determining a secondary boundary smoothness term between the secondary object and the neighboring watershed region, comprises:
computing $$B_{O_k R_i} = \frac{L_2^2}{(L_1 + L_2)^2}$$

wherein $L_2$ corresponds to a length of a boundary shared by the region $R_i$ and primary object $O_k$ and the $L_1$ corresponds to the remaining length of the boundary.

19. The method of claim 12, wherein the step (c) of adding a neighboring watershed region to the primary object based on region competition and a smoothness constraint to form an updated object, comprises:
computing a total force on the neighboring watershed region; and
adding the neighboring watershed region to one of the primary object or the secondary object based on the total force.

* * * * *